J. SWAN.
Improvement in Mortising Machines.
No. 132,608.   Patented Oct. 29, 1872.
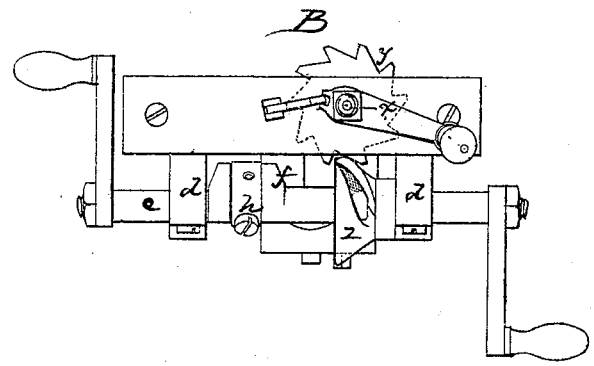
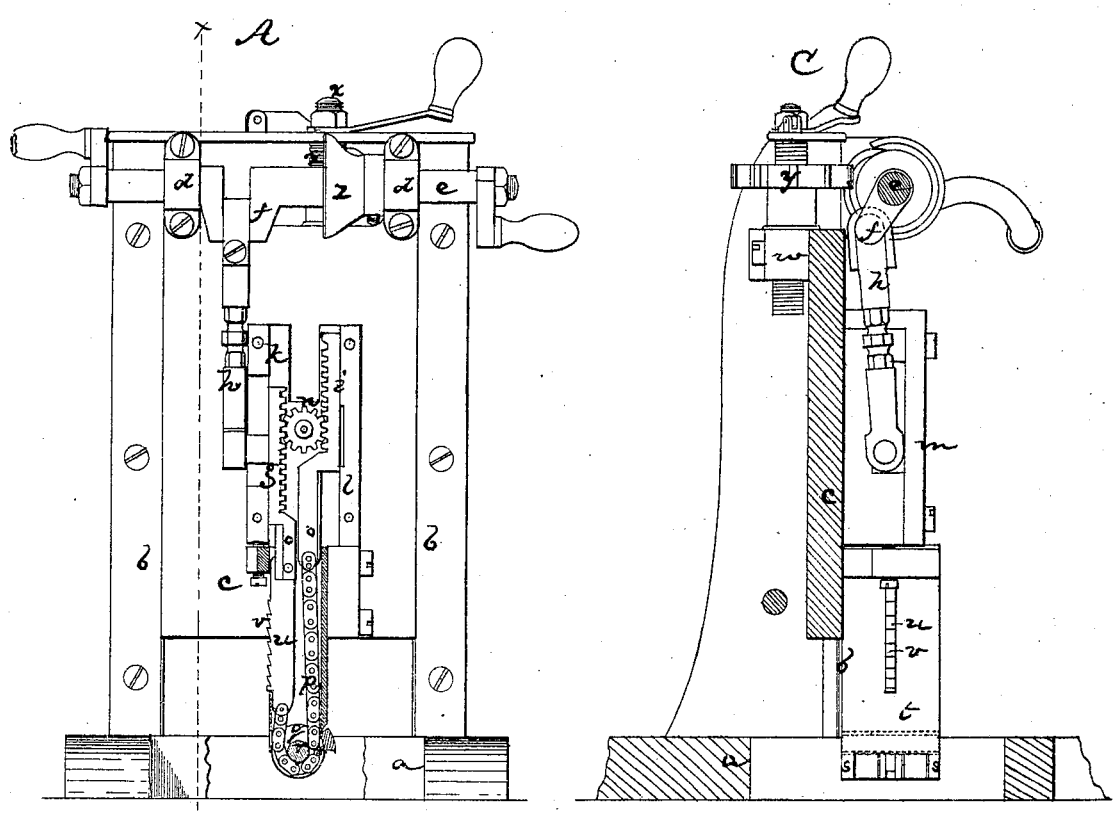
Witnesses.
S. B. Kidder.
L. H. Latimer.
Inventor.
James Swan
by his attys.
Crosby & Gould

UNITED STATES PATENT OFFICE.

JAMES SWAN, OF SEYMOUR, CONNECTICUT.

IMPROVEMENT IN MORTISING-MACHINES.

Specification forming part of Letters Patent No. 132,608, dated October 29, 1872.

*To all whom it may concern:*

Be it known that I, JAMES SWAN, of Seymour, in the county of New Haven and State of Connecticut, have invented Improvements in Mortising-Machines; and I do hereby declare that the following, taken in connection with the drawing which accompanies and forms part of this specification, is a description of my invention sufficient to enable those skilled in the art to practice it.

The invention relates to details of construction and arrangement of parts of a machine for mortising square holes, and to that class of such machines in which the chip is removed by the action of a rotatively-reciprocating cutter, my invention having particular reference to the method of producing the rotative and the progressive movements of the cutter-head, and of discharging the chips made by the cutter.

The drawing represents a machine embodying the invention.

A shows a front and sectional elevation of the machine; B, a plan of it; C, a vertical section on the line $x$ $x$.

$a$ denotes a base, from which rise two uprights that support vertical guideways or rails $b$ $b$, having sliding between them a carriage, $c$, that carries the mortising mechanism. At the top of this carriage are journal boxes or bearings $d$, in which is mounted a horizontal shaft, $e$, and to a crank, $f$, upon this shaft, a gear-plate, $g$, is connected by a link, $h$. This gear-plate $g$ forms one of a pair of sliding gears, $g$ $i$, which slide between suitable guide-plates $k$ $l$, and a cap-plate, $m$, the gears being connected by a gear-pinion, $n$, whose teeth mesh into the teeth of both gear-plates. Each gear-plate has a projecting end piece, $o$, and the two pieces $o$ are connected to the opposite ends of a chain, $p$, that passes around a cutter-head, $q$, which cutter-head has gudgeons $r$ turning in bearings $s$ of a frame, $t$. The chain is jointed to the cutter-head, and by the connection of the chain to the gear-plates, and of the gear-bar $g$ to the link $h$, the rotation of the shaft $e$ effects the reciprocation of the gear-plates, and the reciprocating rotative movement of the cutter-head and its cutter, the edge of the cutter as it moves forward cutting into the wood and removing the chips to form the mortise. By the arrangement of the mechanism that actuates the cutter-head the movements of the cutter are rendered certain and effective. The gear-plate $g$ is not directly jointed to the end of the chain, but is connected thereto by a link or bar, $u$, upon the outer edge of which are ratchet-teeth $v$, which extend through the frame $t$, this bar yielding as the gear-plate $g$ is thrown down, and its teeth retreating into the frame, while, when the gear-plate is drawn up, the teeth $v$ protrude from the frame, and bear with and upon them the shavings formed by the cutter, discharging such shavings from the mortise and keeping it free and unclogged, an essential matter to the proper working of the mechanism.

The progressive downward movement of the cutter is produced as follows: The carriage $c$ bears a nut or screw-threaded sleeve, $w$, through which extends the screw-threaded shank of a feed-shaft, $x$, upon which shaft turns a star-wheel, $y$, into which meshes a cam-wheel, $z$, on the driving-shaft, the wheel $z$ at each rotation of the shaft engaging one of the teeth of the wheel $y$, and by moving it laterally turning the wheel $y$ and the shaft and causing the carriage $c$ to be fed down, the progression of the carriage thus effected causing the cutter to progress vertically in its cutting, and to thereby sink the mortise to the depth required. To raise the carriage and cutter, a suitable winch or handle may be used to turn the shaft, rotation of the shaft effecting the rise of the carriage. When the star-wheel is being turned to lower the carriage the handle is locked in position to keep the shaft from turning.

I claim—

1. The combination, with the gear-plates $g$ $i$, of the cutter-head $q$ and the chain $p$, the plates being operated to rotatively reciprocate the cutter-head, substantially as shown and described.

2. In combination with the chain $p$ and gear-plate $g$, the ratchet-bar $u$ operating to discharge the chips, substantially as described.

JAMES SWAN.

Witnesses:
SAMUEL A. BEACH,
FRED. A. RUGG.